Aug. 27, 1957     C. J. RALSTON     2,804,259
PORTABLE AIR COMPRESSOR
Filed May 10, 1954     2 Sheets-Sheet 1
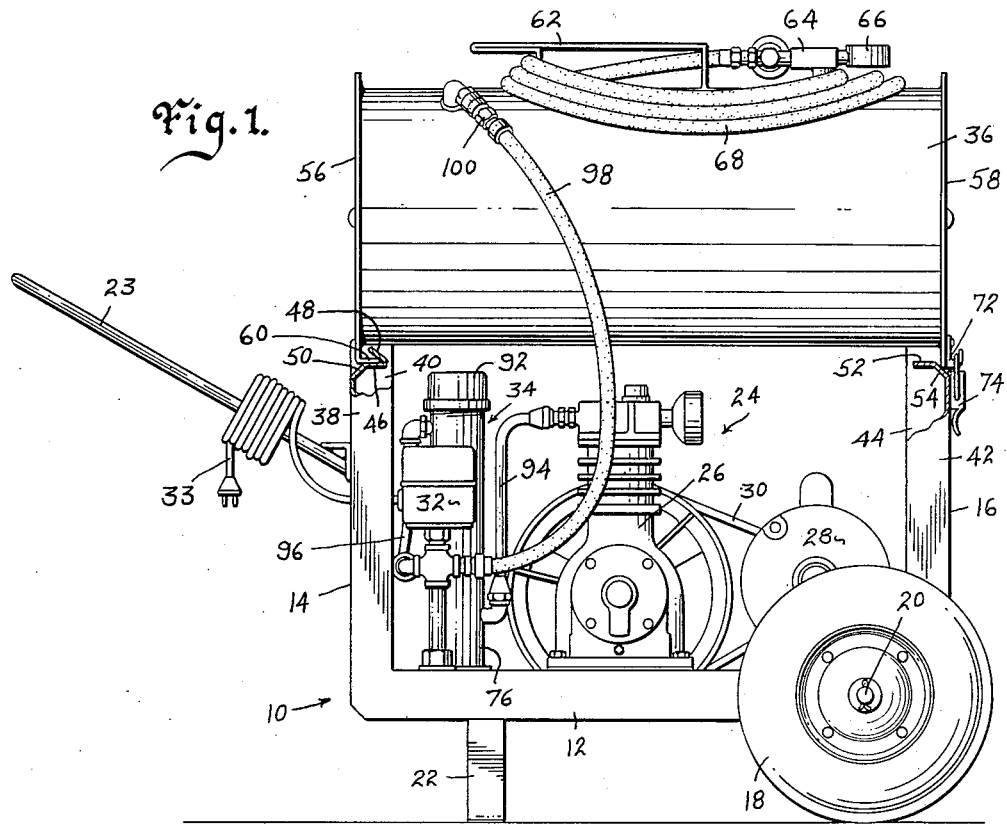
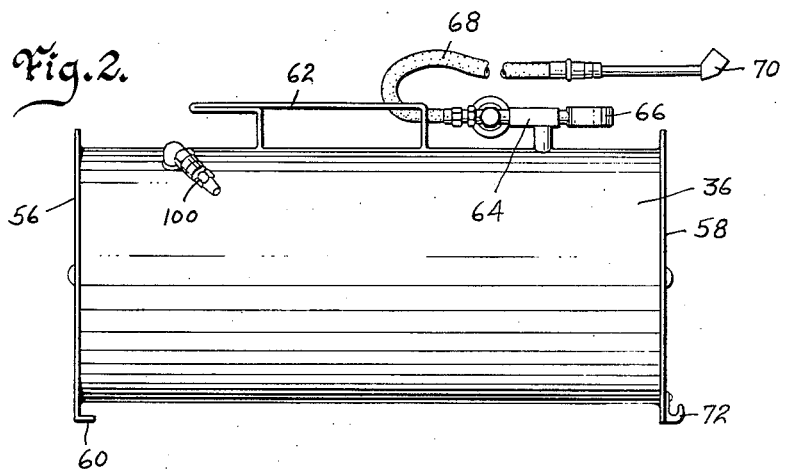
Inventor
Clarence J. Ralston
by Talbert Dick & Adler
Attorneys
Witness
Edward P. Seeley

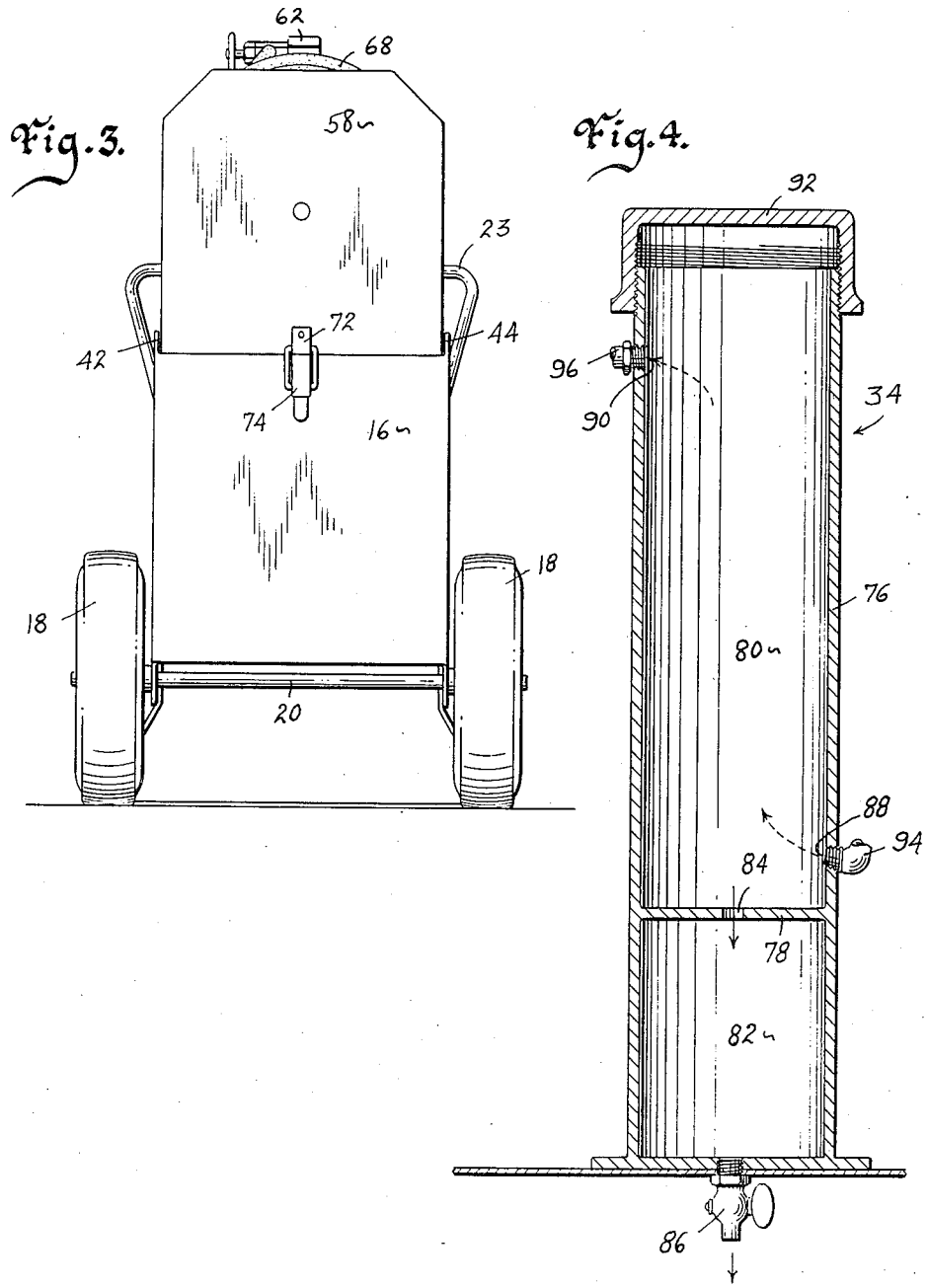

United States Patent Office 2,804,259
Patented Aug. 27, 1957

2,804,259

PORTABLE AIR COMPRESSOR

Clarence J. Ralston, Morrison, Iowa

Application May 10, 1954, Serial No. 428,633

5 Claims. (Cl. 230—58)

My invention relates to improvements in air compressor units and more particularly is concerned with such units of the type mounted on a small wheeled cart or dolly that is intended to be manually moved from place to place.

Such portable compressors find utility in many situations where fixed or stationary compressors are not practical as for example in farm use where compressed air may be required at different times in different locations. In such situations the portable compressor is wheeled or transported in a truck body or the like to the site of use. However, despite the advantages of relative portability, such present type units have certain disadvantages which I have overcome as will later appear, and which I would first like to point out.

The type of compressor which I have referred to herein usually consists of a suitable frame generally mounted on two wheels to form a cart or dolly. On the frame is securely attached the compressor motor and air storage tank with suitable lengths of hose and necessary gauges so that the device is a compact single unit and must be moved or transported as such to the site of use. As a result, if a tractor, for example, with a tire needing air is stranded out in a field, and if by chance the terrain to the tractor may be muddy or soft from plowing, the task of pushing the compressor unit, cart, motor and tank, to within reach of the tractor, can be, and experience has demonstrated that it is, quite burdensome since the compressor unit, even though considered to be portable, is of a substantial weight. In another situation, it may be desirable to use the compressor at a substantial distance from its usual place of storage as at another farm or elsewhere and in this instance, the unit is usually lifted onto a truck or trailer or the like for transporting. Obviously, since the component parts of the unit are not separable, the entire weight must be handled each time the unit is placed into or removed from such a carrying means, and because of its bulkiness, therefore, the handling of such units is frequently too great a task for one person.

With these observations in mind it is one of the important objects of my invention to provide a portable air compressor of the type having air compressing apparatus and an air storage tank mounted on a wheeled frame in such a manner that the air storage tank can be easily and quickly removed from the frame for easy manual portability to a desired site for use.

More particularly it is an object of this invention to provide an air compressor of the above class which embodies novel means for releasably securing a compressed air storage tank to the frame structure thereof.

Another object of this invention is to provide an air compressor unit of the portable class wherein the air storage tank is detachably mounted above the air compressing apparatus.

Still another object of my invention is to provide in combination with an overhead mounted air storage tank on a portable air compressor unit, a water separator unit disposed in the air inlet line to the storage tank intermediate the tank and the air compressing apparatus.

These and other objects will be apparent to those skilled in the art.

My invention consists in the construction, arrangement, and combination of the various parts of the device, whereby the objects contemplated are attained as hereinafter more fully set forth, specifically pointed out in my claims, and illustrated in the accompanying drawings, in which:

Fig. 1 is a side elevational view of a portable air compressor unit illustrating a preferred embodiment of my invention, Fig. 2 is a side elevational view of the compressed air storage tank of Fig. 1 shown detached from the wheeled frame assembly, Fig. 3 is a front view of this compressor unit, and Fig. 4 is an enlarged longitudinal sectional view of the water separator used with this compressor.

Referring to the drawings a cart or dolly shown generally at 10 consists of the bottom 12 and solid rear 14 and front 16 sides or plates. A pair of front wheels 18 are mounted on axle 20 which is suitably secured to the forward underside of bottom 12, a rigid standard or rest 22 depends from the under rear portion of the bottom 12 and a handle means 23 extends from the back side 14 to facilitate the manual maneuvering of the cart as shown in Fig. 1. While no invention is claimed in such a wheeled cart per se, it is pointed out that the solid rear and front sides, 14 and 16 respectively are novel in apparatus of the type involved and have special utility as will later appear.

Air compressing apparatus of any suitable type indicated by the numeral 24 is all mounted on bottom 12 and consists generally of the usual elements such as compressor 26, motor 28 for driving the same by the belt drive 30 and a pressure control member 32. Motor 28 as illustrated is an electric one for which the attached electric cord 33 is provided for connection to a source of electric power, but it will be understood the other types of motors may also be used without departing from the principle of this invention. Also, as a novel feature of this type of apparatus I have used a water separator means 34 also mounted on bottom 12 and disposed in the air line intermediate the compressor 26 and the air storage tank 36 which will be later referred to in more detail. As shown in the drawings tank 36 is mounted in an overhead position relative to compressing machinery 24 and one of the novel aspects of this invention resides in such mounting for a device of this type and means for removing this tank from cart 10 which I will now describe.

With reference to Fig. 1, the side edges of back member 14 are provided with the respective oppositely disposed flanges 38 and 40 which extend forwardly therefrom and similar rearwardly extending flanges 42 and 44 respectively are arranged at the edge of front member 16. Intermediate flanges 38 and 40, the upper edge portion of rear side 14 is bent forwardly so as to form the horizontal shelf 46 and a flat stop member 48, co-extensive in length with the forward edge of shelf 46, is secured to such shelf edge as by welding or the like in such a position as to extend upwardly and rearwardly therefrom at preferably a forty-five degree angle to form a V-shaped recess opening to the rear as shown in Fig. 1 which preferably extends between flanges 38 and 40. Also for added strength the respective ends of stop 48 may be welded to the inner sides of the respective flanges 38 and 40. In forming the structure just described, flanges 38 and 40 may be separate units individually attached as indicated but preferably I have made these flanges and shelf 46 all from one piece of material. This is done by bending the respective sides of back member 14 into the flange portions and then making a cut at the upper portions of the respective bends whereby that portion of back 14 intermediate the cuts can be bent forward as indicated. Also I have found that the horizontal shelf 46 is easily formed if a forty-five degree bend resulting in surface 50 is first made. A rearwardly extending shelf 52 is formed on the front 16 in the same manner as described for shelf 46 so that the inclined surface 54 extends upwardly and rearwardly from the vertical portion of side 16 to the shelf 52.

The air storage tank 36 (Fig. 2) may be of any shape but is preferably of the commonly used cylindrical type to be mounted with its longitudinal axis horizontally and is provided with a rear and front plate 56 and 58 respectively, each of which extend slightly below the lower surface of the tank in its mountable position as shown. At the bottom of plate 56 a forwardly extending arm or hook means 60 is formed and this can be accomplished by bending the lower edge of plate 56 into an L position as illustrated. A carrying handle 62 is placed on the top of tank 36 together with suitable valve 64 and gauge 66 means to which the usual hose 68 with discharge nozzle 70 is attached. Handle 62 is suitably formed so that hose 68 can be coiled thereon as shown in Fig. 1. Thus constructed, tank 36 is mountable on and demountable from cart 10 as follows. To mount the tank 36, it is manually lifted by handle 62 and placed so that hook 60 rests on shelf 46 and extends into the V recess there formed, and the lower edge of plate 58 rests on the inclined surface at some point intermediate the horizontal plane of shelf 52 and the vertical plane of side 16. In this position the weight of tank 36 will tend to urge the lower edge of plate 58 forwardly down the inclined surface 54 and as this occurs, hook 60 will, of course, be pulled tightly into the V recess against stop member 48 so that tank 36 will be held securely in place. Flanges 38 and 40 and 42 and 44 respectively will serve as stop means against lateral movement of the tank and stop member 48 being thus positioned over hook 60 will hold it against vertical movement. While this structure as described is adequate to hold tank 36 in place during movement of cart 10, I have as an added precaution provided a hook 72 on the forward side of the depending portion of plate 58 and a snap-on buckle like means 74 on the upper portion of side 16 for engaging hook 72 if desired.

Another of the novel features in a portable air compressor of the type described which I have embodied in this invention resides in the use of the water separator 34. This consists of an upstanding cylindrical housing 76 provided with a transverse portion 78 in its lower portion to form a separating chamber 80 and a water trap chamber 82. Portion 78 is provided with an opening 84 affording communication between chambers 80 and 82. A pet cock 86 is placed in the bottom of chamber 82, an inlet 88 is provided in the lower portion of one side of chamber 80, an outlet 90 in the upper portion of the opposite side thereof and a removable cap 92 is provided for the top of housing 76. Separator 34 as described is mounted on bottom 12 of cart 10 and inlet 88 is connected by conduit 94 to compressor 26. Outlet 90 is connected by conduit 96 to pressure control unit 32 which in turn is connected to tank 36 by the flexible conduit 98 that is detachably connected to tank 36 by coupling 100 which is of a well known type that serves to prevent the escape of air from tank 36 when conduit 98 is detached. With separator 34 intermediate the compressor 26 and tank 36 it will be appreciated that moisture in the air is removed before the air reaches tank 36. This is accomplished by the agitation of the air within chamber 80 so that water released therefrom can accumulate in chamber 82 from which it can be released by opening the pet cock 86.

From the above disclosure it will be apparent that I not only have constructed an efficient compressor assembly but have by the novel means for removing the tank 36 added considerably to the efficiency and adaptibility of this type of device. By being able to carry only the tank itself, the use thereof is substantially simplified over present compressor units of the portable variety in overcoming the problems previously discussed.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my portable air compressor without departing from the real spirit and purpose of my invention, and it is my intention to cover by my claims, any modified forms of structure or use of mechanical equivalents which may be reasonably included within their scope.

I claim:

1. In combination with a manually portable wheeled cart having air compressing apparatus mounted thereon, a removable manually portable air storage tank comprising, solid rear and front upstanding sides respectively on said cart each having their respective top edge disposed at a level higher than that of said air compressing apparatus, an air storage tank, solid rear and front end plates respectively on said air storage tank, a carrying handle on said air storage tank, the lower end of said rear plate bent upwardly and forwardly to provide a hook means, the upper end of said rear side bent forwardly to form a horizontal shelf, a stop member secured to the forward end of said shelf so as to extend upwardly and rearwardly therefrom to form a V-shaped recess, the upper portion of said front side bent rearwardly to form an inclined surface having its forward end lower than its rearward end, said hook means resting on said shelf, the lower end of said front plate resting on said inclined surface, and said V-shaped stop means limiting the forward and vertical movement of said hook means.

2. In combination with a manually portable wheeled cart having air compressing apparatus mounted thereon, a removable manually portable air storage tank comprising, solid rear and front upstanding sides respectively on said cart each having their respective top edge disposed at a level higher than that of said air compressing apparatus, an air storage tank, solid rear and front end plates respectively on said air storage tank, a carrying handle on said air storage tank, the lower end of said rear plate bent upwardly and forwardly to provide a hook means, the upper end of said rear side bent forwardly to form a horizontal shelf, a stop member secured to the forward end of said shelf, the upper portion of said front side bent rearwardly to form an inclined surface having its forward end lower than its rearward end, said hook means resting on said shelf, the lower end of said front plate resting on said inclined surface, and said stop means limiting the forward movement of said hook means.

3. In combination with a manually portable wheeled cart having air compressing apparatus mounted thereon, a removable manually portable air storage tank comprising, solid rear and front upstanding sides respectively on said cart each having their respective top edge disposed at a level higher than that of said air compressing apparatus, an air storage tank, solid rear and front end plates respectively on said air storage tank, a carrying handle on said air storage tank, the lower end of said rear plate bent upwardly and forwardly to provide a hook means, the upper end of said rear side bent forwardly to form a horizontal shelf, a stop member secured to the forward end of said shelf, the upper portion of said front side bent rearwardly to form an inclined surface having its forward end lower than its rearward end, said hook means resting on said shelf, the lower end of said front plate resting on said inclined surface, and said stop means limiting the forward movement of said hook means, and a forwardly extending flange at end side edge of said rear side to serve as stop means for limiting the lateral movement of said hook means.

4. In combination with a manually portable wheeled cart having air compressing apparatus mounted thereon, a removable manually portable air storage tank comprising, solid rear and front upstanding sides respectively on said cart each having their respective top edge disposed at a level higher than that of said air compressing apparatus, an air storage tank, solid rear and front end plates respectively on said air storage tank, a carrying handle on said air storage tank, a forwardly extending arm on the lower edge of said rear plate, a horizontal shelf extending forwardly from the upper edge of said rear side, a stop means secured to the forward edge of said shelf, the upper edge of said front side formed with an upwardly and rearwardly extending inclined surface, said arm resting on said shelf, the lower end of said front plate resting on said inclined surface, and said stop means limiting the forward movement of said arm.

5. In combination with a manually portable wheeled cart having air compressing apparatus mounted thereon, a removable manually portable air storage tank comprising, solid rear and front upstanding sides respectively on said cart each having their respective top edge disposed at a level higher than that of said air compressing apparatus, an air storage tank, solid rear and front end plates respectively on said air storage tank, a carrying handle on said air storage tank, a forwardly extending arm on the lower edge of said rear plate, a horizontal shelf extending forwardly from the upper edge of said rear side, a stop means secured to the forward edge of said shelf, the upper edge of said front side formed with an upwardly and rearwardly extending inclined surface, said arm resting on said shelf, the lower end of said front plate resting on said inclined surface, said stop means limiting the forward movement of said arm, and a forwardly extending flange at end side edge of said rear side to serve as stop means for limiting the lateral movement of said hook means.

References Cited in the file of this patent

UNITED STATES PATENTS

| | | |
|---|---|---|
| 1,844,416 | Bacher et al. | Feb. 9, 1932 |
| 2,166,780 | Flynn et al. | July 18, 1939 |
| 2,361,393 | Freeman et al. | Oct. 31, 1944 |
| 2,641,045 | Le Valley | June 9, 1953 |

FOREIGN PATENTS

| | | |
|---|---|---|
| 467,892 | Canada | Sept. 5, 1950 |
| 745,405 | France | May 10, 1933 |